United States Patent Office 3,089,859
Patented May 14, 1963

3,089,859
PROCESS FOR MANUFACTURING DIMETHYL-
OLURON-ALKYL-ETHERS AND COPOLYMERS
THEREOF WITH METHYLOLMELAMINE AL-
KYL ETHERS
Teruo Oshima, Sumiyoshi-ku, Osaka, Japan, assignor to
Sumitomo Chemical Company, Ltd., Osaka, Japan, a
corporation of Japan
No Drawing. Filed Feb. 23, 1960, Ser. No. 10,063
Claims priority, application Japan Mar. 3, 1959
4 Claims. (Cl. 260—45.2)

This invention relates to improvements in production of dimethyloluron-alkyl-ethers.

The dimethyloluron-alkyl-ethers are useful as textile-treating agents, adhesives, paints and varnishes, and the like, and are exemplified by compounds of the type

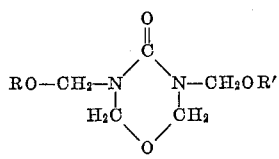

wherein R and R' represent aliphatic hydrocarbon radicals.

These compounds were synthesized from urea, formaldehyde and alcohol by Hiroaki Kadowaki (Bull. Chem. Soc. (Japan) 11, 259 (1936); Osaka Kogyo Shikensho Hokoku, 16th, No. 6, page 23, 1935) but the yields and the purities of products thus obtained by the above described method were extremely low. Consequently appearance of an improved method which may be of great value in industrial scale has been eagerly desired.

The present invention concerns with the method obtaining a highly purified dimethyloluron-alkyl-ether in good yield by reacting 1 mol of urea with 5 mols or more of formaldehyde or a substance which splits off formaldehyde, at a temperature of 40 to 80° C. under keeping the pH more than 10, concentrating the solution in the neutral or acid region, and then by reacting the thus concentrated solution with aliphatic alcohol in an acidic state.

According to the above described synthetic method of Kadowaki, the object products were obtained by admixing 1 mol of urea and 4 mols of formaldehyde with 5 grams of barium hydroxide crystals, heating the mixture for 10 minutes in a boiling water bath, concentrating the mixture as it is, reacting the concentrate thus obtained with methanol after acidifying with hydrochloric acid, concentrating once more, dissolving the concentrate thus obtained in chloroform to settle out the inorganic salt of undissolved material, distilling chloroform, dissolving the residue in ether to separate dimethylolurea-dimethyl ether as an undissolved material, distilling ether off and thereafter taking up the product by vacuum distillation. Except the above described method, there are a few literatures relating to the synthetic method of dimethyloluron-dimethyl-ether such as, for example, U.S. Patent Nos. 2,373,135 and 2,374,647. However, these are only concerning with substantially the same conditions as that of the said Kadowaki's synthetic method.

According to these conventional synthetic methods, as Kadowaki suggested, there are accompanied with marked disadvantages in the case of an industrial mass production. For example, large quantities of dimethylurea-dimethyl-ethers are by-produced; the yield of undistilled crude product, after the separation of the said by-products, is amounted to about 65% of the theoretical amounts and distilled product only about 50% of the theoretical, thus the yield is extremely poor; moreover the process of the said separation is complicated and troublesome and a high vacuum is required for distillation.

Furthermore, when a textile is treated with these resinous products obtained by Kadowaki's method or so and subsequently bleached with a chlorine-containing bleaching agent, the textile fabric thus produced has a tendency of yellowing or is liable to chlorine damage. This phenomenon may be due to the fact that as the undistilled crude product contains large quantities of impurities and even the distilled one contains a little yet, these impurities bring about the deleterious effects of chlorine retention to the fabric. It has been recognized that such a fabric is extremely of less value in the market.

The impurities in the distilled product have the absorption maximum at $11.85\mu$ and at about $12.95\mu$ in an infrared absorption spectrum, so that the existence of the impurities may be determined qualitatively. The chemical structure of these impurities are not determined distinctly, but they are assumed to be such materials as trimethylolureatrimethyl-ether which resembles dimethyloluron-dimethyl-ether in molecular weight and elementary analysis value. Thus, according to the former synthetic methods, the yield of dimethyloluron-dimethyl-ether was too low and the impurities causing the decrease in resin-treatment effect could not be perfectly removed from the product through distillation. Consequently, an improvement of the method for synthesizing dimethyloluron-dimethyl-ethers has been demanded exceedingly.

After a long study on satisfactory synthetic method of dimethyloluron-dimethyl-ether, the inventor has now succeeded in obtaining the said objects by reacting 1 mol of urea with 5 mols or more of formaldehyde or a substance which splits off formaldehyde, at a temperature of from 40° to 80° C. at the pH of more than 10, concentrating the solution in the neutral or acid region, and thereafter reacting it with an aliphatic alcohol in the acid region.

According to the method of this invention, it is not only possible to obtain the desirable product in a remarkably high yield, namely, more than 80% even in case of distilled product and more than 90% in case of undistilled product, but also to obtain a fabric having a superior chlorine-resistance, even if the fabric is treated with this undistilled crude product as well as the distilled one. Thus, the method of this invention is extremely useful from an industrial point of view.

As the molar ratio of urea to formaldehyde according to the method of this invention, an excess amount of formaldehyde is used in comparison with that of the theoretical molar ratio employed in the conventional method. It is necessary to use at least not less than 5 mols of formaldehyde, preferably from 6 to 9 mols, per mol of urea.

When the method of this invention is carried out at less than 5 mols of formaldehyde, the yield of the product decreases by about 20% in comparison with that of the method of this invention, and what is more, the product thus prepared is far inferior to that of the present invention in the chlorine damage of the treated fabric.

As a formaldehyde component, such material as a commonly used aqueous formalin solution and the substances which may split off formaldehyde may be successfully employed. In this case, alcohols such as methanol may be present.

In the next place, at the time of reacting urea with formaldehyde in accordance with this invention, it is requested to maintain the pH more than 10, preferably from 10.5 to 12.

The inventor has also found that when the reaction is carried out at a temperature of more than 80° C. in the same manner with the conventional method, even if the pH of the solution is adjusted to more than 10 at the beginning of the reaction, the performance of the reaction comes rapidly down with the result of the formation of impurities, and on the other hand when the reaction is carried out under a considerably weak condition, viz., at a temperature of from 40° to 80° C., the pH of the solution does not remarkably decrease and the reaction can proceed considerably smoothly. Furthermore, when the reaction is carried out at a temperature of less than 40° C., is may take a long period of reaction time, but such condition may not be acceptable in an industrial scale's production.

The most preferable conditions for the method of this invention are such that the reaction is carried out at a temperature of from 50° to 60° C. and at a pH of from 11 to 12.

After the reaction is over, the solution thus produced is subjected to a concentration process and then the concentrate is alkylated with an aliphatic alcohol. In the conventional method, the said concentration process was effected immediately after the completion of the reaction. However, I have found that if the pH of the reaction solution is maintained at more than 8 during the course of the said concentration, the amount of the resinous impurities increases. Consequently, it is necessary to keep the pH of the reaction solution in an acid or neutral region at the time of concentration of the solution.

After finishing the said concentration, the reaction between the dimethyloluron and the aliphatic alcohol is carried out in an acid region.

The aliphatic alcohol used in the method of this invention includes saturated, unsaturated, acyclic and cyclic alcohol; and also unsubstituted and substituted alcohol. The substituent may be such radicals as hydroxyl, alkoxy and dialkylamino which are inert as they are in the present reaction conditions. Further, the alcohols described hereinabove may contain oxygen or sulfur atom between their hydrocarbon radicals in the molecure.

For example, such alcohol as methyl, ethyl, propyl, isopropyl, butyl, isobutyl, tertiary butyl, octyl, dodecyl, beta-hydroxyethyl, methoxyethyl, ethoxyethyl, butoxyethyl, benzyl, allyl, cyclohexyl, and dimethylaminoethyl alcohol may be employed successfully. Moreover, diethyleneglycol or any mixtures of the above described alcohols may be used.

In order to carry out the process of this invention, 1 mol of urea is preliminarily reacted with 2 mols of formaldehyde to produce dimethylolurea, and then the dimethylolurea is reacted with more than 3 mols of formaldehyde according to the above mentioned conditions of the present invention. According to another modification of the process, pH of the reaction solution wherein urea and formaldehyde are reacting may be less than 10 before the present process is effected. According to a further modification of the process, the formaldehyde may be added in portionwise.

The alkalis used in the present invention include sodium hydroxide, potassium hydroxide, barium hydroxide, and mixtures thereof; organic amines such as triethanol amine; inorganic salts such as sodium carbonate, tribasic sodium phosphate and borax; and also weak alkali such as ammonia.

The inventor has also found that alkylated ether made from copolymer of uron, melamine and formaldehyde gives a more durable chlorine resistant finish than that of the resinous product prepared without using melamine. When more than one-third mol of melamine per mol of urea is employed, the ether product thus produced makes a fabric yellow, after bleaching with chlorine and then heating. Therefore, the amount of the melamine, if used, must be less than one-third mol, preferably from 0.04 to 0.2 mol per mol of urea. In such case, conditions, that is, an amount of formaldehyde, pH of the reaction solution, reaction temperature, the conditions for concentration and alkyl-etherification and others, are all like with those regarding the above mentioned dimethyloluron-alkyl-ethers.

In general, most of the reaction products of urea, melamine and formaldehyde are unstable. Namely, if they are taken in the form of liquid resin, they have such faults that some of them become unclear and others produce solid precipitates or become insoluble in water during the storage. On the contrary, the condensation product prepared by the method of this invention has such features that the product is obtained in the form of homogeneous liquid, and stables after it stands at high temperature, room or low temperature, or even in an aqueous solution. Furthermore, the product thus produced has such benefit too that, as it is a liquid material, the preparation of the resin solution may be easier than starting from creamy resin. The present resin can be pumped.

The following examples will further illustrate this invention but the invention is not restricted to these examples.

EXAMPLE 1

300 grams (5 mols) of urea and 2,433 grams (30 mols) of 37% formalin are mixed with 50 cc. of 40% aqueous sodium hydroxide solution. After the mixture is reacted for 2 hours at a temperature of 60° C. and at a pH of about 11, the reaction solution is neutralized with formic acid to a slightly acidic state and subjected to a vacuum distillation. Then the residue is added with 3,500 grams of methanol and 100 cc. of hydrochloric acid and the combined mixture is stirred for 1 hour. After that the mixture is neutralized and distilled in vacuo to remove the methanol. The precipitated crystals are filtered off and 900 grams of filtrate is obtained. The yield of this crude product amounts to 94.6% based on the theoretical amounts.

Upon further distillation in vacuo, dimethyloluron-dimethyl-ether is obtained as a fraction of B.P. 116°–118° C./0.5–1.5 mm. Hg. The yield amounts to 80.4% after the said distillation and this is excellently superior to that of the conventional method, i.e. less than 60%. Moreover, at the time of this distillation, only an extremely little amount of the residue does remain and the product thus obtained does not be required to remove dimethylolurea-dimethyl-ether by the treatment with ether.

About both undistilled and distilled product, the existence of the impurity whose absorption maximum is at $11.85\mu$ and $12.95\mu$, is not found as the result of the infra-red spectrum examinations, and when fabrics are treated with these products the superior results are obtained in the respects of crease proof and chlorine resistance. On the contrary, the textile fabrics treated with the product obtained by the conventional method, even though the distilled product is employed, not to speak of undistilled one, have an inferior chlorine resistance.

EXAMPLE 2

120 grams (2 mols) of urea, 1,296 grams (16 mols) of 37% formalin and 80 milliliters (1.15 mols) of 40% aqueous sodium hydroxide solution are combined and the mixture thus obtained is heated for 10 minutes at a temperature of 80° C. and at a pH of 11.5. After that, the mixture is cooled, acidified and subjected to a vacuum distillation. The residue is added with 1,800 grams of methanol and 80 cc. of concentrated hydrochloric acid and the mixture thus prepared is stirred for 1 hour. Thereafter the solution is neutralized and the methanol is distilled off. Upon filtration, 355 grams of undistilled product is obtained (93.5% yield). By the further distillation at reduced pressure, dimethyloluron-dimethyl-ether is obtained as a fraction of B.P. 114°–117° C./0.5–1 mm. Hg. The yield of the distilled product amounts to 82%.

EXAMPLE 3

A mixture of 487 grams (6 mols) of 37% formalin and 71 grams (2 mols) of 85% paraform is heated in the alkali region to dissolve completely. To this 60 grams (1 mol) of urea is added and the combined solution is reacted for 1 hour at a temperature of 60° C. and at a pH of 8.5. Thereafter, 20 cc. of 40% aqueous sodium hydroxide solution is admixed with them to adjust the pH to 11.3 and the mixture is continued to react for 1 hour at a temperature of 60° C. After the reaction is over, the mixture is cooled, acidified, condensed, and the residue is added with 600 grams of methanol and 62 grams of ethyleneglycol. The mixed solution is allowed to stand for 30 minutes at a pH of 1.0 to complete the reaction and then neutralized and distilled off the methanol in vacuo to obtain the product.

EXAMPLE 4

To 2,030 grams of 37% formalin (25 mols of formaldehyde), barium hydroxide is added and the pH thereof is adjusted to 10.6. 300 grams (5 mols) of urea and 25.2 grams (0.2 mol) of melamine are combined therewith and the mixture thus obtained is heated for 1 hour at a temperature of 70° C. After cooling, the mixture is subjected to a vacuum distillation at a temperature of less than 50° C. To the remaining viscous liquid, 4 kilograms of methanol is added and the combined solution is adjusted to a pH of 1.0 with hydrochloric acid. The solution is stirred for 30 minutes at a room temperature, and thereafter neutralized with sodium hydroxide and distilled off the methanol. By separating the precipitated crystals through filtration, a stable condensation product is obtained as a liquid. This product is very useful as a textile finishing agent.

EXAMPLE 5

1,620 grams (20 mols) of 37% formalin is added with triethanolamine and the pH of the solution is adjusted to 8.0. Thereafter, 120 grams (2 mols) of urea is added to and the combined solution is reacted for 2 hours at a temperature of 50° C. To the said solution, 42 grams (one-third mol) of melamine and sodium hydroxide are added, the pH thereof is adjusted to 11.8, and the mixed solution is reacted for 1 hour at a temperature of 70° C. After cooling, the mixture is made slightly acidic with hydrochloric acid and concentrated in vacuo. To the remaining liquid, 1 kilogram of methanol and 50 milliliters of concentrated hydrochloric acid are added and the mixture thus obtained is stirred for 1 hour. After that, the solution is neutralized with sodium hydroxide and distilled off the methanol in vacuo. Upon distillation, 480 grams of the condensation product is obtained. The product thus prepared is very stable even if the aqueous solution is made therefrom. The following Table 1 shows the effects of resin finishing for fabrics in which the cotton broad cloths are treated respectively with the resinous products prepared by the method of Examples 1 and 5 of the invention and with dimethyloluron-dimethyl-ether obtained by the above described method of Kadowaki. "A" and "B" in Table 1 show the resin baths respectively which are prescribed as hereinbelow described.

|  | A | B |
|---|---|---|
| The resinous product | 6.5 | 8.1 |
| Hexahydrate of Zinc nitrate | 0.75 | 0.95 |
| Added water to | 100 | 100 |

To these baths, each fabric is dipped in twice and nipped in twice and the wet pick up of the resins is controlled to 60%. After that, each fabric is subjected to drying for 2 minutes at a temperature of 105° C. and curing for 5 minutes at a temperature of 140° C. Thus treated fabrics are then subjected to soaping.

*Table 1*

|  | Crease resistance | | Tear Strength | | Chlorine damage (percent) | | Yellow Index | |
|---|---|---|---|---|---|---|---|---|
|  | A | B | A | B | A | B | A | B |
| Undistilled product of Example 1 | 215 | 231 | 1,335 | 1,245 | 23 | 25 | 2.3 | 2.6 |
| Distilled product of Example 1 | 209 | 229 | 1,305 | 1,205 | 18 | 26 | 2.0 | 2.3 |
| Resinous product of Example 5 | 212 | 233 | 1,285 | 1,195 | 10 | 9 | 2.1 | 2.0 |
| Distilled product of dimethyloluron-dimethyl-ether obtained by the method of Kadowaki | 214 | 224 | 1,240 | 1,140 | 53 | 47 | 5 | 5.3 |

The said crease resistance was determined according to the Monsanto method and the tear strength was determined according to the Elmendorf method. The chlorine damage and the yellow index were obtained respectively by the chlorine resistance test method of AATCC 65–52 after finishing such treatment that the fabrics were boiled with an aqueous solution of 1.0% soap and 0.75% soda ash for 1 hour, neutralized with acetic acid solution, and finally subjected to wash and dried in twice.

In all examples described hereinabove, the alkyl-etherifications are proceeded respectively by using methanol. However, the similar good results were also obtained by using such alcohol as ethanol and butanol.

What I claim is:

1. A process for manufacturing dimethyloluron-dialkyl-ethers which comprises polymerizing, at a temperature of 40° to 80° C., one mol of urea to more than 5 mols of a substance selected from the group consisting of formaldehyde and compounds which release formaldehyde at said temperature while maintaining the pH of the solution greater than 10, concentrating the resultant solution in a neutral to acid pH range, and adding to the concentrated product an aliphatic lower alcohol at acidic pH.

2. A process for manufacturing co-polymer of dimethyloluron-dialkyl-ether and methylolmelamine alkyl ether which comprises polymerizing, at a temperature of 40° to 80° C., one mol of urea, less than one-third mol of melamine and more than 5 mols of a substance selected from the group consisting of formaldehyde and compounds which release formaldehyde at said temperature while maintaining the pH greater than 10, concentrating the resultant solution in a neutral to acid pH range, and adding to the concentrate an aliphatic lower alcohol at acidic pH.

3. A process for manufacturing dimethyloluron-dialkyl-ether which comprises polymerizing, at a temperature of 50° to 70° C., one mol of urea 6 to 9 mols of a substance selected from the group consisting of formaldehyde and compounds which release formaldehyde at said temperature while maintaining the pH 10.5 to 12.0, concentrating the resultant solution in a neutral to acid pH range, and adding to the concentrate an aliphatic lower alcohol at the acidic pH.

4. A process for manufacturing co-polymer of dimethyloluron-dimethyl-ether and methylol melamine methylether which comprises adjusting the pH of a mixture comprising one mol of urea, 0.1 mol of melamine and 7 mols of formaldehyde to 11.5, heating the mixture at a temperature of 60° C. for about 2 hours, adjusting the pH to about 5.0, concentrating the resultant solution in vacuo, and adding methylalcohol to the concentrate at a strongly acid pH.

References Cited in the file of this patent
UNITED STATES PATENTS

| | | |
|---|---|---|
| 2,322,979 | Siegel | June 29, 1943 |
| 2,350,894 | Honel | June 6, 1944 |
| 2,361,715 | Swain et al. | Oct. 31, 1944 |
| 2,670,341 | Joffe | Feb. 23, 1954 |
| 2,749,257 | Knup et al. | June 5, 1956 |
| 2,797,206 | Suen et al. | June 25, 1957 |